United States Patent
Geiger et al.

(10) Patent No.: US 7,923,051 B2
(45) Date of Patent: Apr. 12, 2011

(54) METHOD FOR THE MANUFACTURING OF A SOY PROTEIN-BASED PREPARATION

(75) Inventors: Rupert Geiger, Altenkunstadt (DE); Mickael Labbe, Montlhéry (FR)

(73) Assignee: Compagnie Gervais Danone, Levallois-Perret (FR)

( * ) Notice: Subject to any disclaimer, the term of this patent is extended or adjusted under 35 U.S.C. 154(b) by 1152 days.

(21) Appl. No.: 11/578,996

(22) PCT Filed: May 9, 2005

(86) PCT No.: PCT/IB2005/001806
§ 371 (c)(1),
(2), (4) Date: Oct. 19, 2006

(87) PCT Pub. No.: WO2005/110127
PCT Pub. Date: Nov. 24, 2005

(65) Prior Publication Data
US 2007/0218188 A1 Sep. 20, 2007

(30) Foreign Application Priority Data
May 14, 2004 (EP) .................................... 04291247

(51) Int. Cl.
*A23L 1/20* (2006.01)
(52) U.S. Cl. ......... 426/656; 426/634; 426/442; 426/521
(58) Field of Classification Search .................. 426/656, 426/634
See application file for complete search history.

(56) References Cited

U.S. PATENT DOCUMENTS

| | | | |
|---|---|---|---|
| 5,342,641 A | 8/1994 | Masutake et al. | |
| 5,409,725 A | 4/1995 | Connolly | |
| 7,101,585 B2 * | 9/2006 | Shen et al. | 426/656 |
| 7,357,955 B2 * | 4/2008 | Shen et al. | 426/590 |
| 2003/0021874 A1 | 1/2003 | Nunes et al. | |
| 2003/0099753 A1 | 5/2003 | Yang | |
| 2008/0206416 A1 * | 8/2008 | Geiger | 426/330.3 |

FOREIGN PATENT DOCUMENTS

| | | |
|---|---|---|
| EP | 0 958 746 A1 | 11/1999 |
| EP | 1 250 845 A1 | 10/2002 |
| EP | 1 338 210 A1 | 8/2003 |
| EP | 1 488 708 A1 | 12/2004 |
| JP | 58-13358 A | 1/1983 |
| JP | 60-256372 A | 12/1985 |
| JP | 63-27403 A | 11/1994 |
| JP | 7-16084 A | 1/1995 |
| JP | 7-59512 A | 3/1995 |
| JP | 2510435 B2 | 6/1996 |
| JP | 2834345 B2 | 12/1998 |
| JP | 2004-222527 | 8/2004 |
| WO | WO 86/03377 A1 | 6/1986 |
| WO | WO 2005/046361 A1 | 5/2005 |
| WO | WO 2005/063056 A1 | 7/2005 |

OTHER PUBLICATIONS

Circle et al., "Soy Proteins in Dairy-type Foods, Beverages, Confections, Dietary, and Other Foods," J. Am. Oil Chemists' Soc., Jan. 1974, 51:198A-199A.
Leskauskaite et al., "Influence of the level of pectin on the process of protein stabilization in an acidified milk system," Milchwissenschaft, VV GmbH, Volkswirtschaftlicher Verlag, 1988, 53(3), 149-152, XP000754512.
Patent Abstracts of Japan, vol. 0070, No. 83 (C-160), Apr. 6, 1983 (abstract of JP 56-109444, Jul. 15, 1981).

* cited by examiner

*Primary Examiner* — Anthony Weier
(74) *Attorney, Agent, or Firm* — Foley & Lardner LLP

(57) ABSTRACT

Method for the manufacturing of a soy protein-based preparation comprising hydration of soy proteins and thickener agent in two different recipients which are combined and homogenized with subsequent acidification, and soy protein-based preparations obtained by said method, and use of said preparations to be introduced in acidic products.

21 Claims, No Drawings

METHOD FOR THE MANUFACTURING OF A SOY PROTEIN-BASED PREPARATION

This application is a National Stage application of PCT/IB2005/001806, filed May 9, 2005, which claims priority from European patent application EP 04291247.7, filed May 14, 2004. The entire contents of each of the aforementioned applications are incorporated herein by reference.

The present invention relates to a method for the manufacturing of a soy protein-based preparation and to soy-protein based preparations obtained by said method, and to the use of said preparations to be introduced in acidic products.

In the last two decades, a lot of studies have proved the health benefits of soy proteins, for example reduction of menopause symptoms, reduction of cholesterol level, decrease of cancer prevalence, etc.

Moreover, soy-based products or partially soy-based products are a good alternative for peoples which are allergic to cow's milk.

The consumers could find many products containing soy ingredients but these products are mostly made of 100% vegetables, i.e., these products contain "soy-milk" made from crushed soy beans mixed with water.

Different companies try to develop acidic products containing soy proteins such as dairy products.

Milk-containing acidic beverages or acidic-dairy products have been creating a large market in the recent soft drink industry for their refreshing taste and flavor, supported by natural- and health-conscious consumers. Due to the diversified preference of consumers, the market recently demands a wide variety of milk-containing acidic beverages such as those of low-calorie and those containing components that contribute to maintenance of one's heath such as fruit juice or vegetable juice.

Acidic dairy products of low-calorie type are likely to have problems of aggregation and sedimentation of suspended milk protein particles.

Milk-containing acidic beverages that contain fruit and/or vegetable juice, usually include various components that react with milk proteins, such as polyphenols, to adversely affect the stability of suspended milk protein particles.

Document EP 1 338 210 discloses a composition useful for stabilizing a protein, especially a soy protein, suspension in an aqueous acidic liquid. This stabilizing composition is comprised of a high methoxyl pectin (HMP) and a propylene glycol alginate, in appropriate ratios. Document EP 1 338 210 also discloses a method for stabilizing proteins, especially soy proteins, in aqueous acidic liquids, wherein said method comprises:
1) hydrating a protein material in an aqueous solution,
2) hydrating the stabilizing composition in an aqueous solution, this aqueous solution being either the same as the one used in step 1) or a separate and distinct one,
3) mixing the resulting hydrated solution(s) under given conditions of time and temperature, and optionally adding other agents such as flavouring agents, colouring agents, defoamers, nutrients, and sweeteners,
4) acidifying the resulting mix to a pH of from 3.0 to 5.5 to form an aqueous acidic protein suspension,
5) vigorously mixing to homogenize this suspension, and
6) if desired, heat-treating the homogenized suspension, e.g., via pasteurisation.

From EP 1 250 845 is disclosed a method that facilitates production of a milk-containing acidic beverage, a low-calorie milk-containing acidic beverage, and a milk-containing acidic beverage containing fruit and/or vegetable juice. Aggregation and sedimentation of suspended milk protein particles are inhibited by the method which includes the steps of:
1) providing a starting material including at least milk, soybean dietary fibers, pectin, and an acidifier, preparing a mixture containing the milk and the soybean dietary fibers but not containing pectin, and adding the acidifier to the mixture to prepare a primary mixture having a pH of 3.0 to 4.2,
2) adding the pectin to the primary mixture to obtain a secondary mixture and
3) homogenizing the secondary mixture to obtain a milk-containing acidic beverage.

JP 58013358 patent application discloses an acidic soybean soup beverage preparation and a method for preparing it. The method consists of the following steps:
1) about 15-100 mg % calculated as calcium ion of calcium salt (e.g., calcium lactate, calcium chloride), a saccharine (e.g., sucrose, inverted sugar) and a stabilizer (pectin, alginic acid propylene glycol ester) are added to an extracted solution of soybean protein (e.g., soybean milk prepared conventionally), and
2) the prepared solution is preferably heated at about 50-70° C. so that the soybean protein is stabilized,
3) an acidic material (fruit juice and/or organic acid such as citric acid, etc.) is then added to the solution, to give an acidic soybean milk drink.

JP 60256372 patent application discloses an acidic protein drink preparation and a method to prepare it. The initial mixture contains the pectin and the soy protein together with other components.

Moreover, it is known a method for producing acidic protein food, wherein water-soluble soybean saccharines and pectin are added simultaneously (Japanese Patent No. 2834345), a method for producing an acidic milk drink, wherein a dairy product is fermented with lactic acid bacteria in the presence of water-soluble hemicellulose derived from soybeans (JP 759512-A), and a method for producing a dairy product, wherein a dairy product is subjected to lactic fermentation in the presence of a stabilizing agent such as a high methoxyl pectin (JP 6327403-A).

Further, it has also been proposed a method for producing an acidic milk drink, including the steps of dissolving a stabilizing agent such as pectin and saccharides, mixing and dissolving a milk component therein, adjusting the pH to a predetermined acidity with an acidic substance, and adjusting the particle size distribution of 95% of suspended milk protein particles in the final product to fall within the range of 0.1 to 6 μm to have the average particle size from 0.5 to 1.2 μm (Japanese Patent No. 2510435).

Also proposed is a method for preparing a protein-containing acidic beverage composition, wherein a mixture of a protein solution and sugar is added to an acid liquid under stirring (JP-7-16084-A). These methods, however, take advantage of the protein-protective effect of sugar upon adjusting the pH with an acidifier, so that these methods cannot be applied to the preparation of a low-calorie product that is substantially free of sugars other than the sugar derived from milk.

As well, it is known that addition of fruit or vegetable juice to milk containing acidic beverages will further promote aggregation and sedimentation of the suspended particles, since milk protein is unstable under acidic conditions, and polyphenols and the like contained in fruit and vegetable juice tend to react with milk protein.

As well, it is known that soy proteins added to fruit or vegetable juice precipitate easily. The main problem posed in the manufacture of this type of acidic products (dairy product or fruit juice . . . ) is the precipitation of soy proteins while adding acid.

Therefore, it is a goal of the present invention to find a novel method for preparing soy protein-based preparations and acidic products containing them, avoiding aggregation and sedimentation.

The Inventors of the present invention have found a new method for the preparation of soy protein-based preparations and acidic products containing them, said method avoiding protein precipitation during acidification, pasteurization and whole storage.

One object of the present invention is a method for the manufacturing of a soy protein-based preparation comprising the following steps:

1) hydration of soy proteins and of at least one thickener agent is carried out in two different recipients:

a) an aqueous composition containing soy proteins is heated at a temperature comprised between 50 and 90° C. during a period comprised between 2 to 60 minutes, b) an aqueous composition containing at least one thickener agent is heated at a temperature comprised between 55 and 90° C. during a period comprised between 2 to 60 minutes, 2) the aqueous compositions obtained in steps 1a) and 1b) are mixed for homogenization of the preparation, 3) the homogenized preparation obtained in step 2) is acidified to a pH comprised between 3 and 5.5, and 4) optionally, the preparation obtained in step 3) is heat-treated for long conservation.

The Inventors of the present invention have found that the separate hydration of the protein mixture on the one hand, and of the thickener agent mixture on the other hand, inhibits protein precipitation. In addition, homogenizing the mix of both mixtures before acidification increases protection of the proteins from precipitation. Actually, in most of the yet known processes, protein preparations are first acidified, and are then homogenized (see, for instance, EP 1 338 210 and EP 1 250 845 mentioned above). Nevertheless, the Inventors have surprisingly found that an enhanced protein protection is achieved when an homogenizing step is added to the manufacturing process prior to the acidifying step.

In a preferred embodiment, the thickener agent is selected from the group consisting of algae extract, alginic acid, alginate, agar-agar, carraghenan, carob bean meal, tamarin bean, guar meal, gum such as xanthan gum and carob gum, and pectin.

Other thickener agents may be used depending on the final acidic product to obtain.

In a most preferred embodiment, the thickener agent is pectin or xanthan gum or carob gum or a mix thereof.

In a preferred embodiment, in step 1a), the heating is carried out at a temperature comprised between 65 and 80° C. during a period comprised between 5 and 50 minutes, and in step 1b), the heating is carried out at a temperature comprised between 60 and 80° C. during a period comprised between 3 and 40 minutes.

In another preferred embodiment, the heating in step 1a) is carried out during a period comprised between 10 and 30 minutes, and the heating in step 1b) is carried out during a period comprised between 5 and 20 minutes.

In another preferred embodiment, the heating in step 1a) is carried out during a period of about 15 minutes, and the heating in step 1b) is carried out during a period of about 12 minutes.

In the present invention, the term "about" means that the considered value may vary to less or more than 10%.

Preferably, the heating in step 1a) is carried out at a temperature of about 75° C., and the heating in step 1b) is carried out at a temperature of about 78° C.

The homogenization in step 2 is preferably carried out under a pressure of 180 bars. Under these conditions, the soy protein-based preparation becomes less sandy, and the soy proteins have a better functionality. Moreover, the hydration increases interactions between the proteins and the thickener agent. In other words, the separate hydration in step 1) of soy proteins on the one hand, and of thickener agent(s) on the other hand, gives better, enhanced hydration, which results in an interesting smoother texture of the product.

Preferably, the acidification of the preparation in step 3) is carried out with citric acid at a pH comprised between 4 and 4.5, and most preferably at a pH of about 4.2.

According to the use of the soy protein-based preparation obtained by the method of the present invention, step 4) of said method is carried out either by performing a pasteurization step or by implementing an ultra heat treatment (UHT) process. Usually, pasteurization is much more cheaper than an UHT process. Commonly, suppliers of fruit preparations are only able to perform a pasteurization but not a UHT process.

In a preferred embodiment, the heat treatment for long shelf life in step 4) is carried out by pasteurization.

Said pasteurization is preferably carried out at a temperature of about 110° C. during a period of about 30 seconds.

In a preferred embodiment of the method according to the present invention, between steps 3) and 4), the preparation is mixed during a period of about 10 minutes at a temperature of about 112° C.

Preferably, the preparation obtained in step 4) is further cooled at a temperature below 45° C. for storage.

More preferably, the aqueous composition of step 1a) is obtained by addition of soy extract powder in water.

It is further possible to add various other components in the preparation, those components being selected from, e.g., stabilizers, flavors, colorants, sweeteners, fruits . . . .

Another object of the present invention is a soy protein-based preparation obtained by the method according to the invention.

Another object of the present invention is the use of a soy protein-based preparation according to the present invention to be introduced in an acidic product.

By "acidic product", it is meant, in the present invention, all types of acidic products such as dairy products, fruit juices, mixes of dairy products and fruit juices, etc. . . .

Another object of the invention is a method to prepare an acidic product containing soy proteins, comprising mixing a soy protein-based preparation according to the present invention with an acidic product.

In a preferred embodiment, the mixing step is carried out at the end of the preparation of the acidic product.

The soy protein-based preparation according to the present invention may be stored for a long time before use, and remains stable because of its low pH.

In addition to obtain a soy protein-based preparation and an acidic product containing it, while avoiding aggregation and sedimentation of proteins, the present invention has other advantages.

The difficulty which generally arises in the industry while attempting to manufacture products containing soy proteins, is to differentiate the lines of production that use soy proteins from those that do not use soy proteins. The early use of preparations containing soy proteins in the manufacturing process would require a cumbersome cleaning of the lines of production, should the same lines been used for manufacturing products that do not contain soy proteins. Thus, the method according to the invention makes it possible to avoid this cumbersome cleaning of the lines of production, insofar as the preparation containing soy proteins is added at the end of the production process.

Also, in addition to have a good and long stability, the soy protein-based preparations of the invention are free from any microbiological contamination.

Yet another advantage of the method according to the present invention is that it allows production of soy protein-based preparations with soy protein contents as high as at least about 16% in weight, even about 20% in weight, whereas such protein contents are usually not reachable using the methods disclosed so far (see, e.g., in EP 1 338 210 mentioned above, the protein content in the final acidic liquids ranges preferably from 0.01% to 8% by weight of liquid, more preferably from 1% to 3% by weight of liquid, whereas the protein content in the final products obtained according to the present invention may be for example of up to about 12% in weight).

EXAMPLE 1

Preparation of a Stirred Yoghurt with a Soy Protein Based Preparation

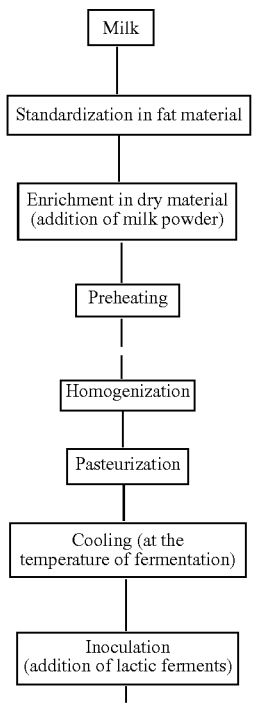

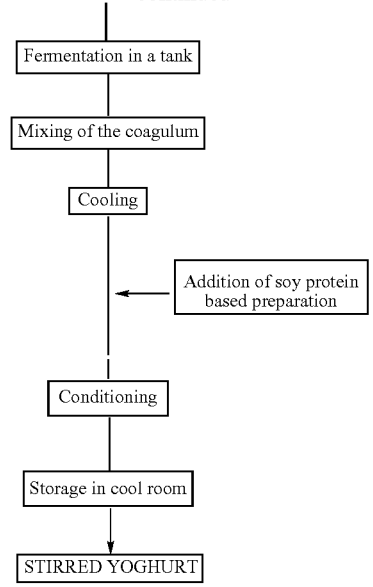

EXAMPLE 2

Preparation of Soy Containing Fruit Juice Based Preparation

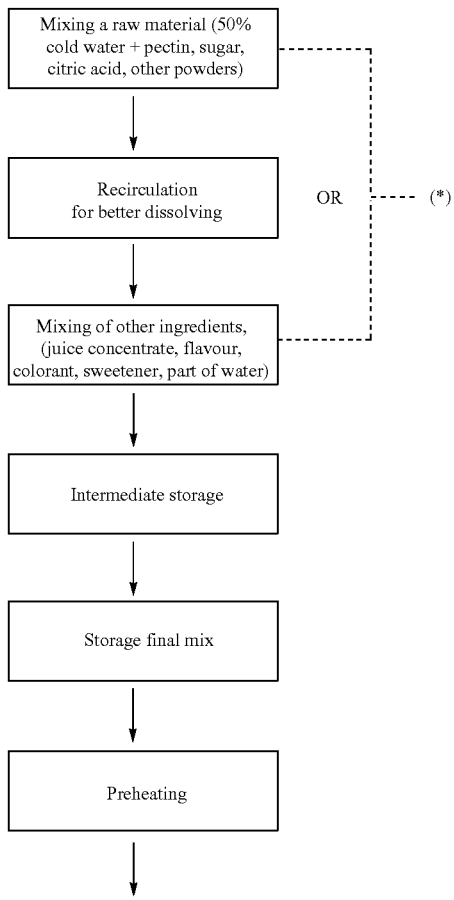

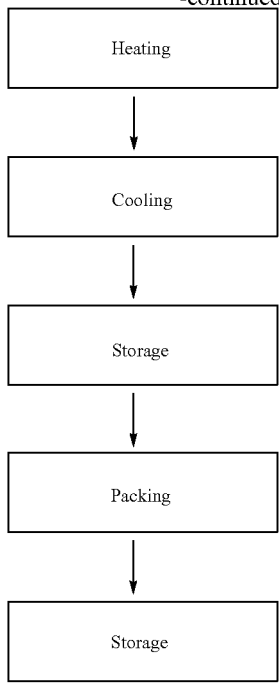

(*) Addition of soy protein-based preparation

The invention claimed is:

1. Method for the manufacturing of a soy protein-based preparation comprising the following steps:
   1) hydration of soy proteins and of at least one thickener agent is carried out in two different recipients:
      a) an aqueous composition containing soy proteins is heated at a temperature comprised between 50 and 90° C. during a period comprised between 2 to 60 minutes,
      b) an aqueous composition containing at least one thickener agent is heated at a temperature comprised between 55 and 90° C. during a period comprised between 2 to 60 minutes,
   2) the aqueous compositions obtained in steps 1a) and 1b) are mixed for homogenization of the preparation,
   3) the homogenized preparation obtained in step 2) is acidified to a pH comprised between 3 and 5.5, and
   4) optionally, the preparation obtained in step 3) is heat-treated for long conservation.

2. Method according to claim 1 wherein the thickener agent is selected from the group consisting of algae extract, alginic acid, alginate, agar-agar, carraghenan, carob bean meal, tamarin bean, guar meal, gum, and pectin.

3. Method according to claim 2 wherein the thickener agent is pectin or xanthan gum or carob gum or a mix thereof.

4. Method according to claim 1, wherein in step 1a), the heating is carried out at a temperature of between 65 and 80° C. during a period of between 5 and 50 minutes, and in step 1b), the heating is carried out at a temperature of between 60 and 80° C. during a period of between 3 and 40 minutes.

5. Method according to claim 1, wherein the heating in step 1a) is carried out during a period of between 10 and 30 minutes, and the heating in step 1b) is carried out during a period of between 5 and 20 minutes.

6. Method according to claim 5, wherein the heating in step 1a) is carried out during a period of about 15 minutes, and the heating in step 1b) is carried out during a period of about 12 minutes.

7. Method according to claim 1, wherein the heating in step Ia) is carried out at a temperature of about 75° C., and the heating in step Ib) is carried out at a temperature of about 78° C.

8. Method according to claim 1, wherein the homogenization in step 2) is carried out under a pressure of 180 bars.

9. Method according to claim 1, wherein the acidification of the preparation in step 3) is carried out with citric acid at a pH comprised between 4 and 4.5.

10. Method according to claim 1, wherein the acidification of the preparation in step 3) is carried out with citric acid at a pH of about 4.2.

11. Method according to claim 1, wherein the heat treatment for long conservation in step 4) is carried out by pasteurization.

12. Method according to claim 11, wherein the pasteurization is carried out at a temperature of about 110° C. during a period of about 30 seconds.

13. Method according to claim 1, wherein between steps 3) and 4), the preparation is mixed during a period of about 10 minutes at a temperature of about 112° C.

14. Method according to claim 1, wherein the preparation obtained in step 4) is further cooled at a temperature below 45° C. for storage.

15. Method according to claim 1, wherein the aqueous composition of step 1 a) is obtained by addition of soy extract powder in water.

16. Method according to claim 1, wherein various other components are added in the preparation, said components being selected from stabilizers, flavors, colorants, sweeteners, and fruits.

17. Soy protein-based preparation obtained by the method according to claim 1.

18. An acidic product comprising the soy protein-based preparation according to claim 17.

19. Method of preparing an acidic product containing soy proteins, comprising mixing the soy protein-based preparation according to claim 17 with an acidic product.

20. Method according to claim 19 wherein the mixing step is carried out at the end of the preparation of the acidic product.

21. Method according to claim 2, wherein said gum is selected from the group consisting of xanthan gum and carob gum.

* * * * *